March 9, 1937.　　　　　G. T. BALFE　　　　　2,072,863
GASKET
Filed Aug. 22, 1934　　　　2 Sheets-Sheet 1
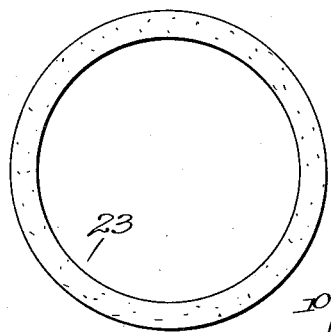
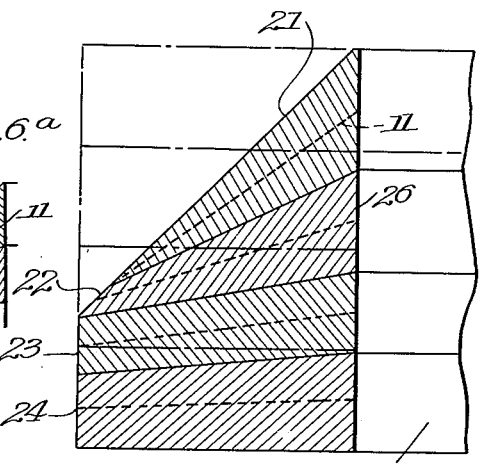
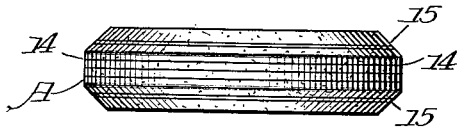
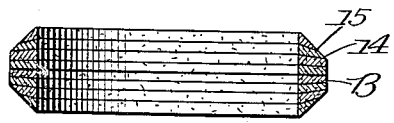
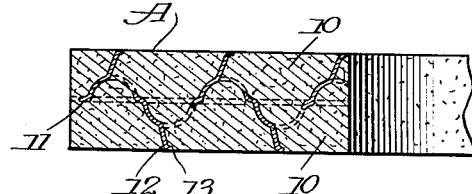
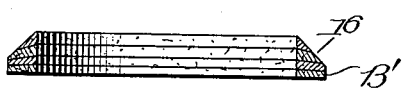
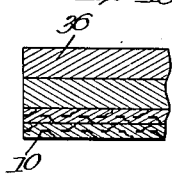
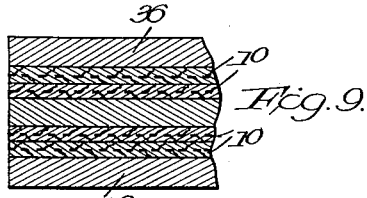
Inventor
George T. Balfe.
By Cushman Darby & Cushman
Attorneys March 9, 1937.                G. T. BALFE                2,072,863
                               GASKET
                        Filed Aug. 22, 1934            2 Sheets-Sheet 2
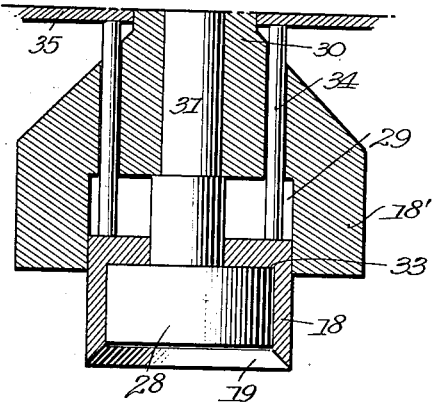
Fig. 7.
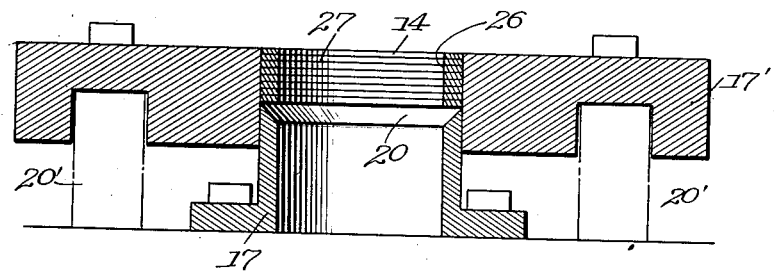
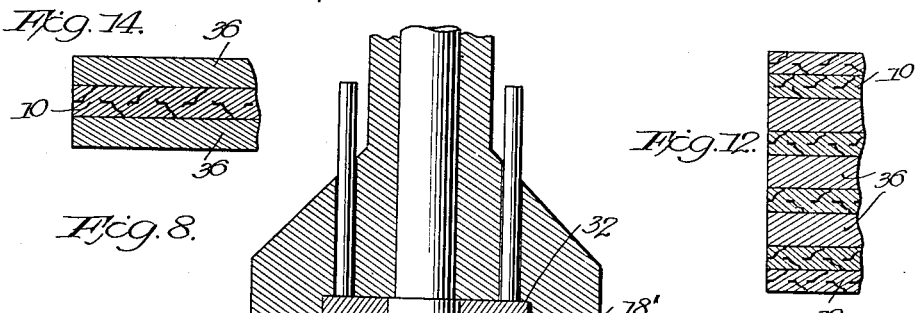
Fig. 14.
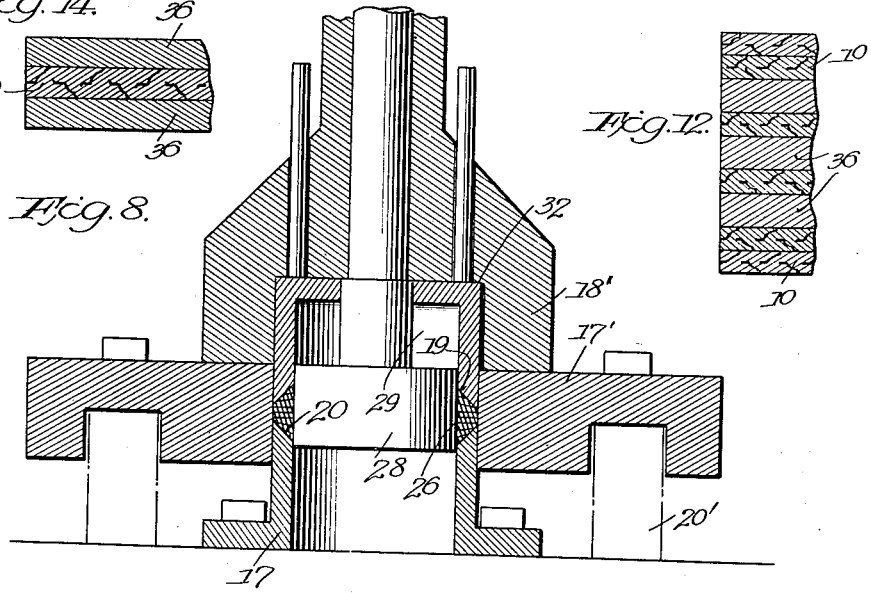
Fig. 8.       Fig. 12.
Fig. 13.
Inventor
George T. Balfe
By Cushman, Darby, & Cushman
Attorneys Patented Mar. 9, 1937

2,072,863

UNITED STATES PATENT OFFICE 2,072,863

GASKET

George T. Balfe, Detroit, Mich., assignor to Detroit Gasket & Mfg. Company, Detroit, Mich., a corporation of Michigan Application August 22, 1934, Serial No. 741,024

3 Claims. (Cl. 288—1)

My invention relates to gaskets adapted for sealing joints having various types of contact surfaces and seating surface contours.

One object of the invention is to provide a gasket having a beveled edge or other shape as required, which is formed in such a manner as to reinforce and strengthen the packing against distortion and disintegration, and without recourse to expensive methods of manufacture.

In the method of making the gasket of this invention, I preferably use laminated units of any of the structures shown in my Patents Nos. 1,776,140, 1,788,041, 1,927,450 and 1,928,585, and applications Serial Nos. 703,647 and 690,739. These units comprise in general (1) a metal layer and a cushion sealing layer; (2) a metal insert layer disposed between two layers of cushion sealing material; (3) a metal layer partially or entirely covering the edges and surfaces of the cushion layers of such units.

As set forth in said patents, the metal layer is preferably provided with a multiplicity of struck-up projections extending throughout its area which are embedded within the layers of cushion material by pressure.

The units are treated with an adhesive and superposed to form a built-up structure of the desired thickness; this built-up structure having the contour of the individual units is subjected to an axial compression for the purpose of forming the beveled edge or other required contact surface contour and for adhesively uniting the units into a single body structure or gasket.

This compression of the gasket to give the desired contour or beveled edge takes place upon the built-up structure having the contour of the individual units and by resorting to a compressing of the built-up structure the necessity of cutting or otherwise shearing the gasket or subjecting it to final smoothing operations to perfect the contour is eliminated; at the same time the interior wall or edge of the gasket defining the gasket opening or openings is maintained smooth, continuous and unobstructed.

Briefly stated, by compressing the built-up structure, the interior wall defining the gasket opening is not distorted while exteriorly, the units are distorted by the compression into a suitably shaped structure. This compressing of the metal and cushion material layers densifies and strengthens the gasket at the points of greatest wear, i. e., the contact surfaces of the gasket with the joint. Hence, the gasket is resistant to any further distortion such as would ruin the seal by reason of conditions surrounding its use, and is not affected by disintegrating influences.

In the drawings:

Figure 1 is a top elevation representative of a ring of circular gasket of the present invention.

Figure 2 is a side elevation of the gasket shown in Figure 1 having divergent beveled edges.

Figure 3 is a sectional view of the gasket shown in Figures 1 and 2.

Figure 4 is a sectional view similar to Figure 3, but wherein the gasket is provided with but a single beveled edge as distinguished from divergent beveled edges as shown in Figures 2 and 3.

Figure 5 is a view of one of the units disclosed in my Patent No. 1,776,140, which are employed in superposed relation to form the built-up structure of the present gasket.

Figure 6 is a sectional view enlarged to show the densifying and reinforcing effect of the compressing action whereby the beveled edge is formed; this result obtains with both the divergent beveled edge gasket of Figures 2 and 3 and the single beveled edge gasket of Figure 4.

Figure 6a is a detail view showing how the units are compressed and locked together.

Figures 7 and 8 illustrate one manner in which the gasket is compressed to form the final product of Figures 1 to 4 inclusive.

Figures 9, 10, 11 and 12 and 14 are partial sectional views of various built-up gasket structures comprising metal and cushion layer units and units devoid of metal layers.

Figure 13 is a sectional view of a built-up structure in which the metal and cushion layers are integral.

Referring to the drawings, in Figure 5 I have illustrated a gasket unit A comprising layers of cushion sealing material 10 of asbestos or similar material with a metal insert 11 disposed therebetween. The insert 11 has projections 12 struck therefrom which are embedded in the sealing material layers by pressure. Preferably the ends 13 of the projections extend to the outer surface of the gasket material layers 10 and are bent over to lie in the plane thereof, forming a smooth outer surface. The gasket material shown in Figure 5 will take any of the forms illustrated in my aforesaid patents and applications, the structure of Figure 5 being disclosed in my Patent No. 1,776,140.

The units A are built up to provide the desired gasket thickness and the respective units are adhesively united by a suitable adhesive 14 which is temperature, pressure, and water resistant. Examples of suitable adhesives are shellac and glue although other adhesives may be employed. The units, moreover, may be secured together by means of rivets or metal stitching.

The gasket illustrated in Figure 2 is provided with divergent beveled surfaces 15 while the gasket shown in Figure 4 is provided with a single beveled surface 16. Other shapes and contours will be formed as required in accordance with the contact surfaces of the joint with which the gasket is associated. For example, the edges 15 and 16 may be rounded and in the case of the gasket shown in Figures 2 and 3, one edge 15 may be rounded and the other edge 15 beveled. Referring to Figure 3, the interior units B are shown as being compressed but retaining substantially their original contour and as not being greatly deformed. However, on the other hand, the angle or extent of the contour imparted to the gasket is changed as required and the two beveled surfaces 15 may converge to a medial line relative the gasket, in which case the interior layers B will be more or completely deformed. The same changes may be made in the gasket shown in Figure 4 in that the contour 16 may extend so as to include completely the edges of the lower units B', i. e., this unit may be deformed to produce the desired contour or simply compressed and but slightly deformed.

In the manufacture of the gasket, the units A are sprayed with adhesive 14, the interior units upon both sides and the exterior units upon one side only. Thereafter, the units with the adhesive in wet condition are built up on the fixed die 17 to the required height as shown in Figure 7. It will be observed that the built-up structure has the form and shape of the individual units A. In this condition, it is acted upon by the movable die 18 in the manner shown in Figure 8. In the present instance, the fixed and movable dies are formed with beveled surfaces 19 and 20 so that a gasket having divergent beveled edges 15 as shown in Figure 2 is produced. The contour of dies 17 and 18, of course, will be changed in size and shape in accordance with the contour which it is desired to impart to the final product.

In addition to producing the desired contour in the built-up structure, the compressing action also acts to unite the several units by means of the adhesive 14. Of course, the built-up structure with units adhesively united may be preformed and then placed on the fixed die 17, but I prefer to accomplish the adhesive union of the units simultaneously with the compressing of the built-up structure into its final shape.

The outside units will preferably have their contact or surface portions coated with a nonsticking material such as graphite and a suitable film forming resistant layer may be employed cooperating with the graphite layer to protect the same and reduce the possibility of sticking of the gasket to the joint contact surfaces, to a minimum, all as described in my application Serial No. 648,691.

The compressing apparatus illustrated in Figures 7 and 8 is preferred although other types may be employed and, as stated, the contours 19 and 20 of the dies 17 and 18 will be varied in size and shape as required.

This compressing apparatus comprises the fixed die 17 with which is associated a movable and preferably resilient mounted head 17' guided by said die, as shown, and resiliently supported at 20' in any suitable manner as by coil springs.

The movable die comprises the head 18', and movable therewith and with respect to the head in the recess 29 is the die 18, the mandrel 28 moving with the head 18' with which it is associated and within the die 18. These members are guided in their movement by the wall of the recess in the head 18' as shown.

The head 18' is reciprocated by a shaft or rod connected to the upper end 30 of the head; the mandrel is reciprocated by the shaft 31 with head 18', and the die 18 is forced downwardly and compressed upon the work when engaged by the head 18' as shown at 32, and is drawn upwardly from the work by the lifting movement of the mandrel 28 as shown in Figure 7 at 33, wherein the mandrel is shown as engaging the top of die 18 in the lifting movement of the latter and thereby lifting the die.

The die 18 is therefore mounted for reciprocation and has a free sliding movement in the head 18'. It carries stop pins 34 which limit its upward movement by engagement with the stop plate 35.

In the operation of the machine or press, assuming the gasket to have been formed as shown in Figure 8, the upward movement of the head, mandrel and die tend to carry with them the gasket which adheres to the mandrel. In the course of this upward movement, the pins 34 engage the stop plate 35 and the continuing upward movement of the mandrel within the die ejects the gasket from the mandrel due to the withdrawal of the mandrel into the die as shown in Figure 7. This is advantageous in operating since the release of the gaskets is automatic and at a point where the operator can easily pick up each gasket without effort, since the gasket has been discharged or ejected from the mandrel.

Referring to Figure 6, it will be noted that the compressing operation serves (1) to densify and (2) to deform the metal and cushion sealing material layers. This serves to reinforce and fortify the gasket at the points of greatest wear. For example, the principal contact surfaces 21 and 22 of the gasket are highly compressed and the insert material very completely embedded in the alternate layers of the cushion sealing material. By reason of this deformation, the gasket has a most perfect fit, is thoroughly rigid and resists distortion and is fortified to a remarkable extent against the action of fluid pressure, liquid pressure, heat, cold, and chemical action. These are vital considerations in any packing and by preliminarily densifying the gasket into a conforming structure, i. e., having a conforming contact surface or surfaces, the efficiency of the gasket is very much enhanced.

While I have shown in Figure 6 only the units 21 and 22 as being substantially deformed, the units 23 and 24 are also deformed and densified as shown. The units 21 and 22, as will be observed, constitute the contact surface of the gasket and a perfectly conforming fit is obtained without the necessity for subsequent treatment of the gasket after the compressing action. The deformation takes place as shown in Figures 6 and 6a so that the density of the cushion material increases progressively from the wall of the gasket opening to the peripheral edge of the gasket.

The innermost layer B may not be distorted by the compressing action but simply become densified. In this connection, if desired, one or more uncompressed units may be adhesively united to the compressed layers 21, 22, 23, 24 for the purpose of forming a gasket as shown in Figure 4. Also, if desired, gaskets such as shown in Figure 4 may be formed and their bases adhesively united to produce a gasket having divergent beveled edges as shown in Figure 3. In either instance, the interior layers B or B' may be either compressed or compressed and deformed or constitute uncompressed units adhesively applied after the other units have been compressed. I prefer, however, to form the gasket in the manner heretofore described using a compressing apparatus as illustrated in Figures 7 and 8.

In Figures 6a, I have illustrated how the gasket units in some cases nest at their outer peripheries. Thus the upper unit 11 is deformed to have in effect a continous circumferential bead or projection 10' fitting in a similar groove 11' in the next unit beneath, and thus one or all of the units are locked in position against both longitudinal and transverse strains on the gasket when under pressure. If desired, beads 10' and groove 11' are preformed in the units before they are built up. Such projections may be continuous or spaced and likewise with the corresponding grooves or recesses. The projections and corresponding grooves and recesses may be disposed circumferentially as shown, or disposed interiorly of the units.

Referring to Figures 6, 7 and 8, and particularly Figure 7, it will be noted that the interior wall 26 defining the gasket opening 27 is smooth and unobstructed before compression. This condition is maintained during compression by means of the mandrel 28 which as shown in Figure 8 is positioned coextensive with the interior wall 26 during the compressing operation. This mandrel not only aids in assuring that the wall 26 of the final product will be undistorted and continuous, but also aids by cooperating with the fixed and movable dies in providing for an efficient shaping of the gasket by the compressing action. Again as the mandrel is withdrawn from the gasket opening as above described, the wall is given a wiping and smoothing.

In Figure 5, the gasket unit A is illustrated as comprising a metal layer, sandwiched between the cushion layers. However, I may use plain metal and cushion layers in any built-up arrangement, preferably, however, disposing the cushion and metal layers alternately with the cushion layers exposed; I may also use units consisting of a single cushion layer and a single metal layer of the type described in my aforesaid patents.

The compression action of a built-up structure having the initial form or shape of its units, as explained, serves to fortify and reinforce the gasket. All of the material of the original built-up structure is retained and compressed to a highly densified condition so that the gasket will resist deformation as well as disintegration.

The greatest deformation of the gasket by the compressing action described takes place with the outermost units while the inner units are deformed to a proportionately decreasing extent as shown in Figure 6, the innermost units being only slightly deformed but all of the units are compressed and densified. Dependent upon the character of the dies and the number of units, some of the lowermost units will not be deformed but simply compressed and densified.

As stated, I prefer to adhesively unite the units simultaneously with the compressing action but the complete built-up structure shown in Figure 7 may be preformed and the units adhesively united prior to compression.

In Figure 9, I have illustrated a structure having metal-cushion layer units A and units or layers of cushion gasket material 36 devoid of metal. The layers 36 constitute the surface layers and core. Again the units A are the surface layers and core and the units 36 the intermediate layers.

In Figure 10 the units A are the surface layers enclosing the units or layers 36. This structure may be reversed to form a built-up structure in which the units A are the inner layers and the units or layers 36 are the surface layers, as in Figure 14.

In Figure 11, the structure is built up of one or more layers or units 36 constituting one side of the gasket and one or more layers or units A constituting the opposite side. This juxtaposing of pairs of layers or units may be carried out with any of the gaskets herein described, i. e., a single layer 36 or A may be employed or two more of such layers utilized in the various modifications illustrated and described in this application.

In Figure 12, the construction comprises surface layers or units A and alternately superposed units or layers A and 36. The surface layers are in some cases formed of the units 36 and the interior layers alternately interleaved as shown.

In Figure 13 the metal layers are embedded in each two adjacent cushion layers, forming an integral laminated structure or unit having three or more cushion layers and a metal insert between each cushion layers. This unit may be used wherever desired in lieu of one of the units A, e. g., in any of the built-up structures shown.

The units A and 36 may be of any desired thickness and for example the layers 36 which are devoid of metal may be integral of required thickness and the units A may be as thick as desired or integral units as shown in Figure 13 are used, or the units 10 and 36 built up as in Figures 10, 11 and 12.

The cushion material will be asbestos, cork composition, cardboard, or mixtures of insulating material. A cushion layer as described in my Patent No. 1,788,041 is preferred in view of its resistant characteristics.

I have shown the gasket as provided with an external bevelled shape and it will be understood that this contour may be imparted to the interior wall of the gasket. Again, both the interior and exterior walls of the gasket may be shaped as required.

While I have illustrated the gasket as comprising a built-up structure of superposed units, I will, in some cases, take a sheet of the material described in any of my aforesaid patents, for example, that illustrated in Figure 5 and roll the same into a cylinder. In such a construction, the free ends of the cylinder will be bound in any suitable manner to form a sealed joint where required. For example, the metal layer at one end of the sheet projects beyond the cushion layers while at the opposite end, the cushion layers project beyond the metal layer. Thus, when the sheet is rolled into form, the meeting ends of the cylinder are joined by interposing the exposed portion of the metal layer in the space between the exposed portions of the cushion layers and then compressing the seam so as to form a homogeneous cylinder. This cylinder may be shaped in the manner herein described at one or both ends with external or internal bevels or other contours, or provided with both internal and external bevels or contours.

The cylinder so produced may also be severed into rings of appropriate thickness and these rings are provided with internal or external bevels or contours as described herein. The dovetail joint provides a very effective seal which is in effect, homogeneous with the structure of the gasket. As a modification, the gasket material layer on one side of the metal sheet may be displaced with respect to the metal sheet, a greater distance more or less than the cushion material layer on the opposite side of the metal sheet so that the dovetail joint or seam will, in effect, be staggered or stepped.

I have referred to the provision of projections in one unit engaging in suitable grooves or recesses on the opposite or adjacent unit. Thus, each unit will have on one surface, a projection or projections and on the opposite surface, one or more grooves or recesses.

The units 10 as stated above will take any of the forms illustrated in my aforesaid applications and patents. For example, in some cases, the units A will not have the metal projections extending to the surface thereof. On the other hand, a construction will be provided wherein the surface units will have the metal projections extending to the surface while the interior units will have the projections terminating below the surface or vice versa. By a unit having projections extending to the surface, I mean a gasket structure as shown in Figure 5 and by a unit wherein the projections do not extend to the surface, I mean a unit as shown in Figure 4 of my Patent No. 1,776,140.

I claim:—

1. A gasket comprising a multiplicity of separate units, said units consisting of superposed layers of heat resisting cushion material and metal, the metal layers disposed between the cushion layers and having integral prongs for securing said cushion and metal layers together, said gasket having a service opening formed therethrough, means for securing the units together, certain of said layers having their outer peripheral edges compressed to present a substantially beveled peripheral gasket surface, the density of the cushion material increasing progressively from the wall surrounding the service opening to the peripheral edge of the gasket.

2. A gasket comprising a multiplicity of separate units, said units consisting of superposed layers of heat resisting cushion material and metal, the metal layers disposed between the cushion layers and having integral prongs for securing said cushion and metal layers together, said units being adhered together, said gasket having a service opening formed therethrough, certain of said layers having their outer peripheral edges compressed to present a substantially beveled peripheral gasket surface, the density of the cushion material increasing progressively from the wall surrounding the service opening to the peripheral edge of the gasket.

3. A gasket comprising a multiplicity of separate units, said units consisting of superposed layers of heat resisting cushion material and metal, the metal layers disposed between the cushion layers and having integral prongs for securing said cushion and metal layers together, certain of said units having therebetween a layer of heat resisting cushion material devoid of metallic prongs, said gasket having a service opening formed therethrough, means for securing the units together, certain of said layers having their outer peripheral edges compressed to present a substantially beveled peripheral gasket surface, the density of the cushion material increasing progressively from the wall surrounding the service opening to the peripheral edge of the gasket.

GEORGE T. BALFE.